Jan. 22, 1963  C. A. HAWBAKER  3,074,497
TRANSPORTABLE LIVESTOCK WEIGHING APPARATUS
Filed Dec. 12, 1958
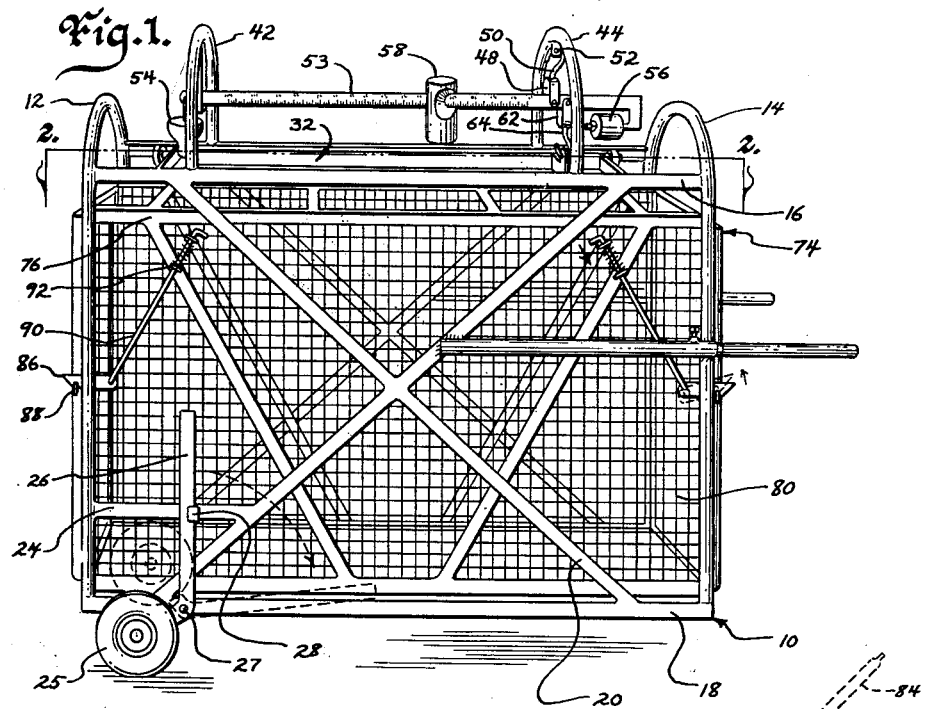
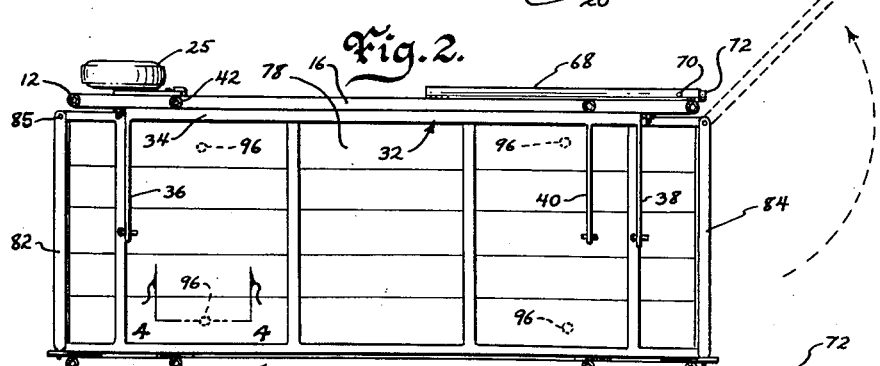
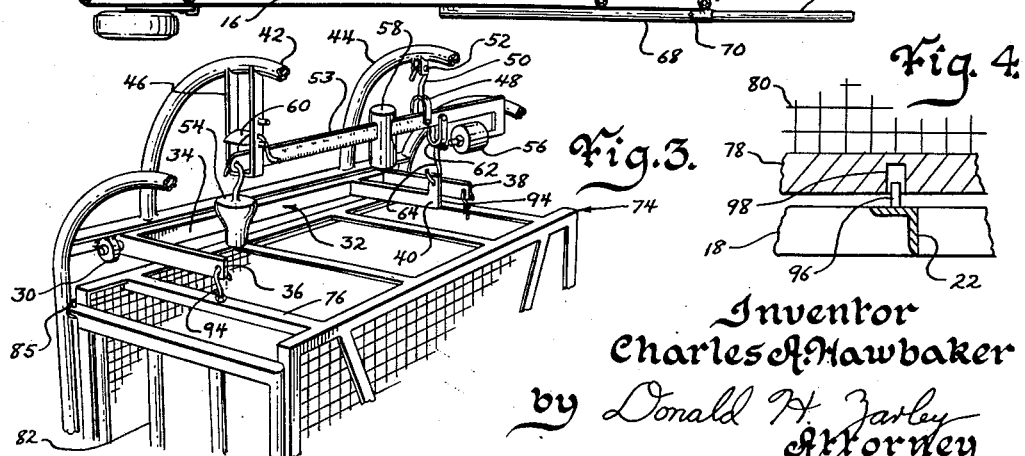
Inventor
Charles A. Hawbaker
by Donald H. Zarley
Attorney

United States Patent Office 3,074,497
Patented Jan. 22, 1963

3,074,497
TRANSPORTABLE LIVESTOCK WEIGHING
APPARATUS
Charles A. Hawbaker, Dallas Center, Iowa
Filed Dec. 12, 1958, Ser. No. 780,081
1 Claim. (Cl. 177—246)

My invention relates to weighing mechanisms and more particularly to a device for weighing livestock.

One of the great problems of the modern farmer is the proper weighing of livestock. Elaborate scales are generally too expensive for the average farm operation, so special hauling to weighing stations must often be implemented. Even when permanent truck-type scales are available on the farm, the scales are often located away from the loading point. When stock farms are located in remote locales, the hauling of the stock long distances for weighing purposes results in weight loss to the stock and financial loss to the farmer.

Therefore, the principal object of my invention is to provide a weighing device which is small, transportable, and capable of being moved about and operated by a single person.

A further object of my invention is to provide a transportable livestock weighing device that may efficiently weigh an animal despit the animal's tendency to move during the weighing operation.

A still further object of my invention is to provide a transportable livestock weighing device which can be conveniently placed adjacent trucks, buildings, corrals and the like to facilitate driving the animals into the weighing device.

A still further object of my invention is to provide a transportable livestock device which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings in which:

FIG. 1 is a perspective view of my device;

FIG. 2 is a top view of my device;

FIG. 3 is a partial perspective view of my device showing the details of the weighing apparatus; and FIG. 4 is a sectional view of my device taken on line 4—4 of FIG. 2.

I have used the numeral 10 to generally designate the frame of my device. Frame 10 is comprised of two end sections 12 and 14 which have their top portions shaped in the form of arches. Horizontal angle irons 16 and 18 connect the top and bottom ends, respectively, of end sections 12 and 14. Braces 20 extend diagonally across each side of frame 10 between the angles 16 and 18. Further bracing of frame 10 can consist of angles 22 which extend across the bottom of the frame to connect angles 18. (See FIG. 4.) Horizontal spars 24 connect bracing 20 and end section 12 on the forward end of the frame.

L-shaped arms 26 are pivoted at their elbows by pins 27 to the forward end of angles 18. A wheel element 25 is rotatably mounted on one end of each arm 26 and the other ends of arms 26 are adapted to engage clips 28 on spars 24 when the wheels 25 engage the ground surface to support the frame 10. Sufficient play should exist between arms 26 and pins 27 to permit arms 26 to be pivoted past clips 28 at times.

Bearing members 30 are welded or otherwise secured to the inside edge of one of the angles 16 and a bracket 32 is rotatably mounted in these bearing members. As shown in FIGS. 2 and 3, bracket 32 is comprised of a bar 34 which extends parallel to angle 16, and three arms 36, 38 and 40 extend laterally from bar 34 to a point substantially over the center line of the frame 10.

Two parallel arch supports 42 and 44 span between angles 16. A V-shaped bracket 46 extends vertically and downwardly from the center of arch 42 and a clevis 48 hangs downwardly from the center of arch 44 by means of hook 50 and pin 52. A conventional weighing beam 53 is pivotally mounted within clevis 48 in any convenient manner and extends through the bracket 46. Weights 54 and 56 of known value are removably secured to opposite ends of beam 53 in conventional fashion. Balance element 58 is slidably mounted on beam 53. A conventional stop latch 60 is movably mounted above the lowermost end of bracket 46 and the beam 53 is balanced whenever the beam hangs free within the space between latch 60 and the bottom of the bracket. A second clevis 62 pivotally embraces beam 53 at a point on the beam outwardly from clevis 48. Clevis 62 hangs downwardly from beam 53 and hook 64 connects the clevis and arm 40 on bracket 32.

Horizontal tubes 68 are welded or otherwise attached to the forward side portions of frame 10 and set screws 70 are adapted to threadably communicate with the interiors thereof. Handle members 72 are slidably mounted within tubes 68 and are adapted to extend beyond the forward end of frame 10 when in their extended position.

I have used the numeral 74 to generally designate my cage device. Cage 74 is comprised generally of a frame 76 which substantially coincides with the internal dimensions of frame 10. A platform 78 covers the bottom of cage 74 and wire mesh 80 covers the sides thereof. Gates 82 and 84 are pivotally connected to the ends of frame 76 by hinge assemblies 85. Gates 82 and 84 are adapted to close the ends of cage 74 at times. Latches 86 are pivoted to frame 76 adjacent the ends thereof and are adapted to engage stop elements 88 on gates 82 and 84 to hold the gates in a closed position at times. Spring-loaded rods 90 extend through bearing elements 92 on frame 76 and are pivoted to latches 86 to facilitate the operation of the latches.

Cage 74 is suspended within frame 10 by the arms 36 and 38 of bracket 32. Hooks 94 extend upwardly from frame 76 to engage these arms 36 and 38. The cage 74 is held against swinging within frame 10 by vertical stud bolts 96 which are welded to the angles 22 on the bottom of frame 10. Bolts 96 extend upwardly and loosely fit into cores 98 in the bottom of platform 78. Bolts 96 do not extend the full distance into cores 98 so as to permit some relative vertical movement between the cage 74 and frame 10.

The normal operation of my device is as follows: With the wheels 25 in their lowered position and the handles 72 held in their extended position by set screws 70, the device, as depicted in FIG. 1, can be moved in wheelbarrow fashion to any place where it is needed. Set screws 70 can be loosened to permit handles 72 to be telescopically withdrawn into tubes 68 so that the end of the device can be abutted against a building, pen, runway or the like. Arms 26 can be rotated in a counter-clockwise direction as viewed in FIG. 1 until they are removed from clips 28. The arms can then be tilted laterally so that they can then be rotated in a clockwise direction past clips 28 to raise the wheels and lower frame 10 to the ground. The lowering of the frame to the ground surface obviously stabilizes the unit during the weighing operation. Either of gates 82 or 84 may be opened in the manner described so that access can be gained to the cage 74. A further advantage of having gates at both ends of cage 74 is that when my device is made a part of a temporary runway from a pen to an awaiting truck, for example, the animals can be driven into the cage from one end, weighed, and then driven on through the runway by utilizing the gate at the other end of the unit.

The weight of the animal in the cage 74 is determined by operating weighing beam 53 in conventional fashion. The weight of the cage 74 is transferred to the weighing beam 53 through hooks 94, arms 36 and 38, bar 34, arm 40, hook 64 and clevis 62. The offset relationship of clevises 62 and 48 create a leverage on beam 53 which, when balanced by element 58 and weights 54 and 56, the weight of the cage can be read on the indicia on the beam 53 under element 58. The cooperation of stud bolts 96 and the cores 98 in platform 78 prevent the cage from swinging during the weighing operation.

Thus, from the foregoing, it is seen that my device will accomplish at least all of its stated objectives.

Some changes may be made in the construction and arrangement of my transportable livestock weighing apparatus without departing from the real spirit and purpose of my invention, and it is my intention to cover by my claim, any modified forms of structure or use of mechanical equivalents which may be reasonably included within its scope.

I claim:

In a transportable livestock weighing apparatus, a frame, a substantially horizontally disposed bracket pivotally secured to one side of the upper portion of said frame for movement about a substantially horizontal axis, first and second arms integral with and extending from said bracket in a substantial horizontal position and alignment, and spaced longitudinal relative to said bracket, a cage, said cage secured to the free ends of said first and second arms, a third arm integral with and extended substantially horizontally outwardly from said bracket between said first and second arms, a weighing device secured to the upper portion of said frame, and a free end of said third arm movably connected to said weighing device.

References Cited in the file of this patent
UNITED STATES PATENTS

| | | |
|---|---|---|
| 748,297 | Mitchell | Dec. 29, 1903 |
| 2,873,106 | Fassbinder | Feb. 10, 1959 |

FOREIGN PATENTS

| | | |
|---|---|---|
| 427,347 | Great Britain | Apr. 23, 1935 |
| 729,225 | Great Britain | May 4, 1955 |
| 791,511 | Great Britain | Mar. 5, 1958 |